US012595903B2

(12) United States Patent
De Bevilacqua et al.

(10) Patent No.: US 12,595,903 B2
(45) Date of Patent: Apr. 7, 2026

(54) LIGHTING SYSTEM

(71) Applicant: ARTEMIDE S.P.A., Milan (IT)

(72) Inventors: Carlotta Francesca Isolina Maria De Bevilacqua, Milan (IT); Paolo Leoni, Milan (IT); Daniele Moioli, Milan (IT); Andrea Gallucci, Milan (IT)

(73) Assignee: ARTEMIDE S.P.A. (IT)

( * ) Notice: Subject to any disclaimer, the term of this patent is extended or adjusted under 35 U.S.C. 154(b) by 38 days.

(21) Appl. No.: 18/633,624

(22) Filed: Apr. 12, 2024

(65) Prior Publication Data

US 2025/0043944 A1 Feb. 6, 2025

(30) Foreign Application Priority Data

Apr. 14, 2023 (IT) ........................ 102023000007236

(51) Int. Cl.

| | |
|---|---|
| ***F21S 8/00*** | (2006.01) |
| ***F21S 8/06*** | (2006.01) |
| ***F21V 21/005*** | (2006.01) |
| ***F21V 21/104*** | (2006.01) |
| ***F21V 21/14*** | (2006.01) |
| ***F21V 21/35*** | (2006.01) |

(52) U.S. Cl.

CPC .............. *F21V 21/35* (2013.01); *F21S 8/038* (2013.01); *F21S 8/066* (2013.01); *F21V 21/104* (2013.01); *F21V 21/14* (2013.01)

(58) Field of Classification Search

CPC ........ F21V 21/005; F21V 21/35; F21S 8/038; F21S 8/066

See application file for complete search history.

(56) References Cited

U.S. PATENT DOCUMENTS

| | | | | |
|---|---|---|---|---|
| 6,244,733 B1 | 6/2001 | Fong et al. | | |
| 7,503,778 B2 * | 3/2009 | Lehman | ................. | F21V 21/35 362/147 |
| 2007/0153516 A1 | 7/2007 | Lehman et al. | | |
| 2011/0170704 A1 | 7/2011 | Smith et al. | | |

FOREIGN PATENT DOCUMENTS

| | | | | |
|---|---|---|---|---|
| DE | 20121011 U1 * | 3/2002 | ............. | H01R 25/14 |
| EP | 0734108 B1 | 10/2001 | | |
| WO | 2019015079 A1 | 1/2019 | | |

OTHER PUBLICATIONS

Search Report issued in Italian Application No. 102023000007236.

* cited by examiner

*Primary Examiner* — Sean P Gramling
(74) *Attorney, Agent, or Firm* — The Belles Group, P.C.

(57) ABSTRACT

A lighting system comprises a band-shaped base element extending along an axis; a plurality of first support elements connected to the base element and provided with fixing members to an external surface, for example a ceiling; and a plurality of lighting devices supported by the base element; the base element comprises a band body longitudinally elongated along the axis and made of a flexible polymeric material and which houses at least a pair of conductive metal wires, for example made of copper, extending parallel to each other and to the axis along the body; the body being foldable by hand about folding axes perpendicular to the axis.

15 Claims, 5 Drawing Sheets

LIGHTING SYSTEM

CROSS-REFERENCE TO RELATED APPLICATIONS

This application claims priority from Italian Patent Application No. 102023000007236 filed on Apr. 14, 2023, the entire disclosure of which is incorporated herein by reference.

TECHNICAL FIELD

The present invention relates to a lighting system.

In particular, the invention relates to a lighting system which can be hung from a ceiling and can be easily installed in various configurations, taking different shapes and extending along a path which can include both straight and curved sections.

BACKGROUND

In general, track lighting systems are used to make lighting systems running along a path. In known track lighting systems, one or more lamps, for example of the spotlight type, are mounted on a longitudinal track element, typically recessed in a ceiling or even hanging therefrom.

Track elements normally consist of rigid elements, for example, rectilinear metal section-bars. The geometry of lighting systems of this kind is thus limited to rectilinear arrangements.

Although curved track elements can also be made, these should precisely be specially made and installed in exactly the original configuration, with no possibility of modification when the lighting system is installed and set up.

Track elements which can be folded to take a curved configuration are also known; however, the versatility and ease of use of these elements may not be fully satisfactory, particularly as they do not easily fit the desired shapes and are also relatively complex and expensive to make and install.

SUMMARY OF THE INVENTION

An object of the present invention is to provide a lighting system which overcomes the drawbacks of the prior art. In particular, it is an object of the invention to provide a lighting system allowing light paths of various shapes, including curved ones, to be made easily and inexpensively.

The present invention thus relates to a lighting system as defined in essential terms in the appended claim 1.

Additional and preferred features of the invention are defined in the dependent claims.

The lighting system of the invention is simple and relatively inexpensive to make and install; moreover, it allows making light paths of various shapes, including curved ones, in a simple and inexpensive way, without requiring special equipment or complex operations during installation.

BRIEF DESCRIPTION OF THE FIGURES

Further characteristics and advantages of the present invention will be evident from the following description of a non-limiting example embodiment thereof, with reference to the figures of the accompanying drawings, wherein.

DESCRIPTION OF EMBODIMENTS

Figure 1:
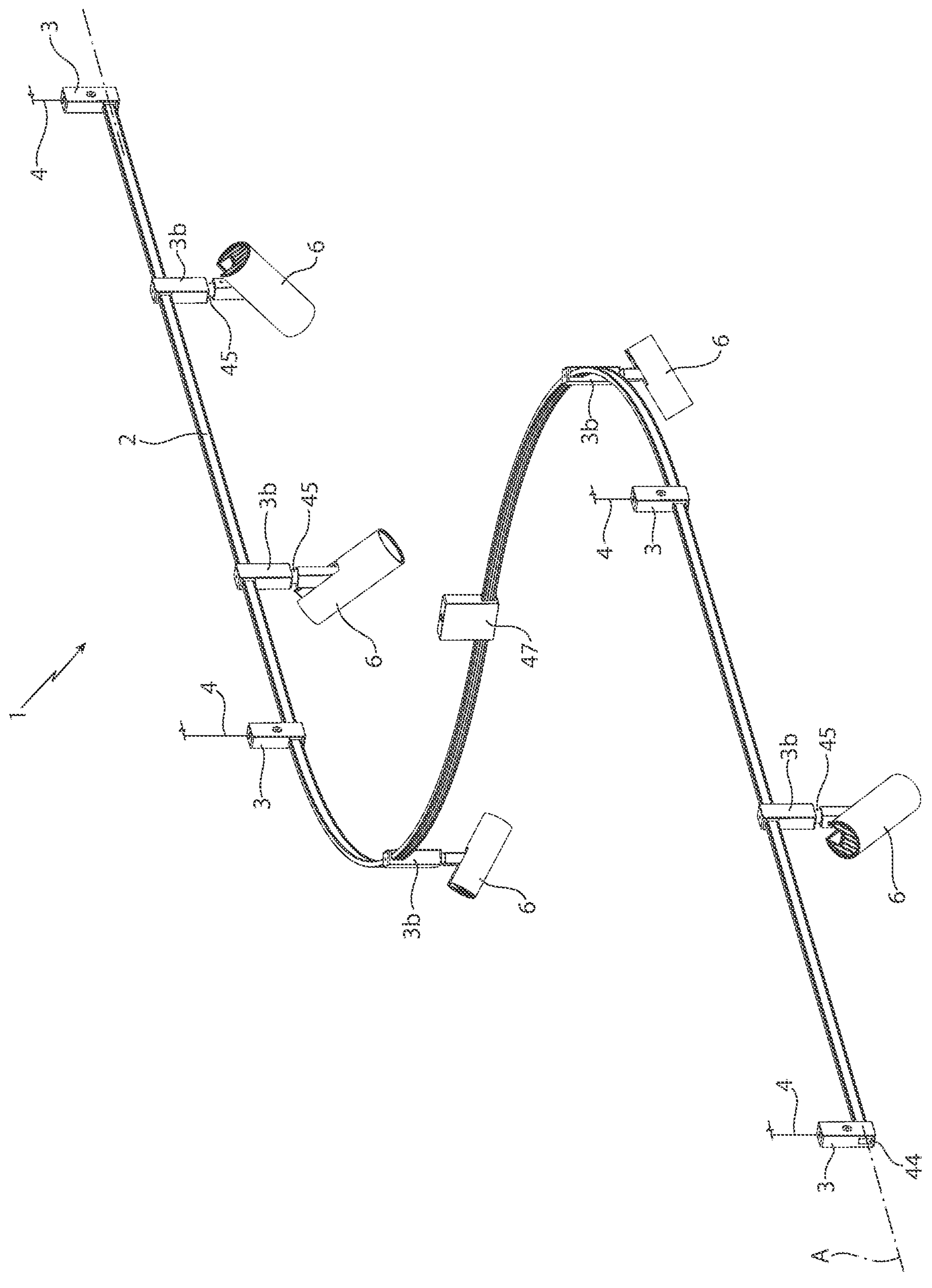
FIG. 1 is a schematic perspective view of a lighting system in accordance with the invention.

With reference to FIG. 1, a lighting system 1 comprises: a band-shaped base element 2 extending along an axis A; a plurality of first support elements 3 connected to the base element 2 and provided with fixing members 4 to an external surface, for example a ceiling; and a plurality of lighting devices 6 supported by the base element 2 and provided with light sources.

Figure 2:
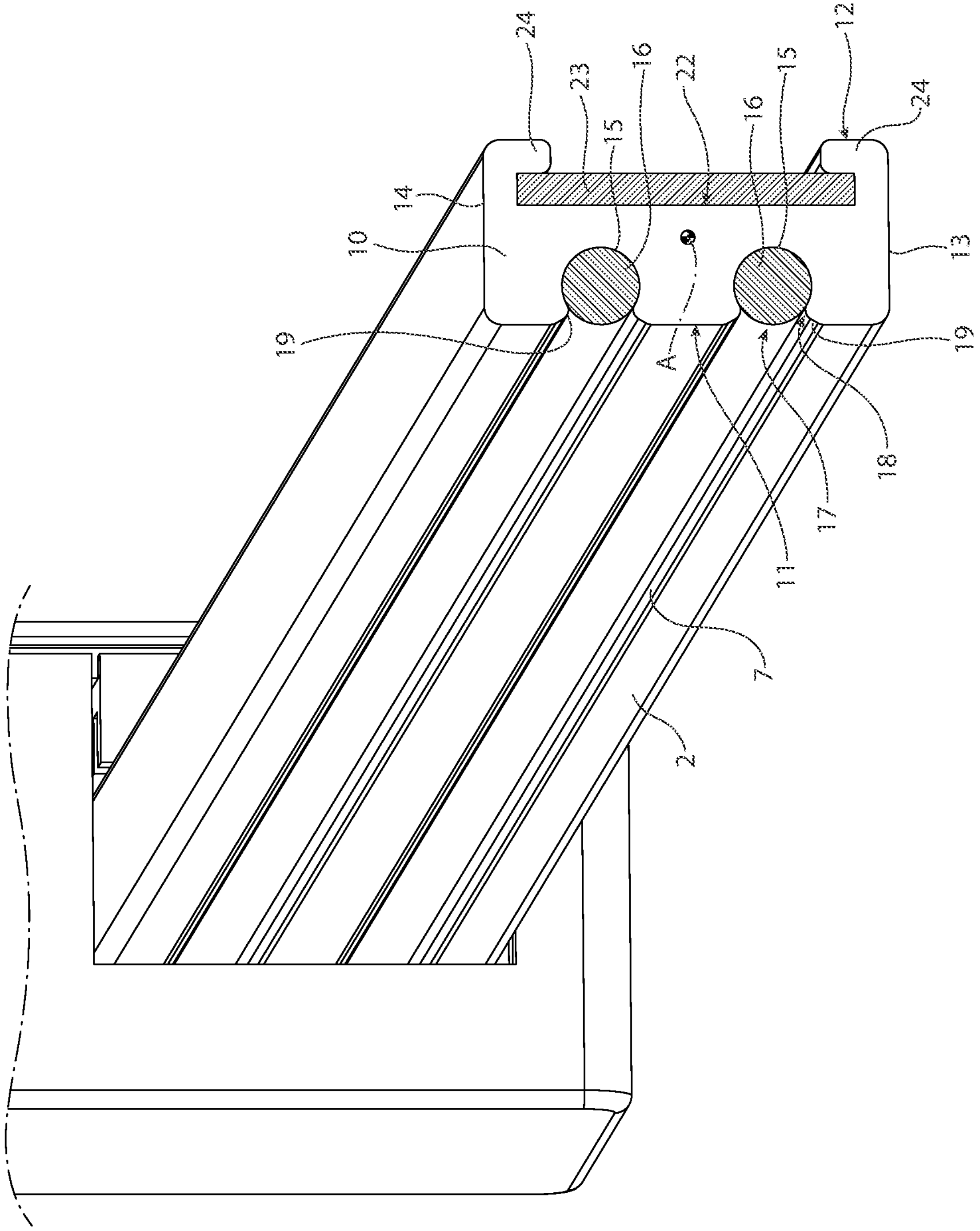
FIG. 2 is a perspective view, partially cut off and with parts removed for clarity, of a detail of the lighting system of FIG. 1.

Also with reference to FIG. 2, the base element 2 comprises a band body 10 longitudinally elongated along the axis A, made of a flexible polymeric material, for example PVC (polyvinyl chloride), PC (polycarbonate), PE (polyethylene), or mixtures thereof.

The body 10 has a flat cross section, for example substantially rectangular, possibly with beveled or rounded edges.

The body 10 has a pair of lateral faces 11, 12 parallel to each other, arranged essentially vertical in use, and a pair of flanks 13, 14 parallel to each other and perpendicular to faces 11, 12 and joining faces 11, 12.

Face 11 has a pair of longitudinal grooves 15 parallel to each other and to the axis A; the grooves 15 house respective metallic conductive wires 16, for example, made of copper, extending into the grooves 15 parallel to each other and to the axis A.

The grooves 15 are open towards the face 11, such that the wires 16 have respective contact portions 17 exposed towards the outside of grooves 15.

Advantageously, the grooves 15 have a cross section corresponding to the cross section of the wires 16 housing and having an angular extension higher than 180° so as to secure the respective wires 16 therein.

In the illustrated non-limiting example, the wires 16 have a circular cross-section and the grooves have an arc-of-a-circle-shaped cross-section.

Therefore, each wire 16 is inserted and secured in the respective groove 15 by a shape coupling; the insertion of the wires 16 into the grooves 15 occurs due to the elasticity of the body material 10.

In more detail, each groove 15 is provided with a front opening 18 formed in the face 11 of the body 10 and extending longitudinally along the entire body 10. The opening 18 is delimited laterally by respective longitudinal edges 19 extending towards each other: the distance between the edges 19 (measured perpendicular to the axis A) is less than the diameter of the groove 15 and the wire 16 housed therein.

Preferably, the wires 16 have a (circular) surface cross section not higher than 3.0 $mm^2$, preferably not higher than 2.5 $mm^2$ and in particular between 0.5 $mm^2$ and 2.5 $mm^2$, in particular about 1.5 $mm^2$.

The face 12, opposite the face 11 provided with grooves 15, has a longitudinal channel 22 parallel to the axis A and housing a flat reinforcement foil 23, for example made of metal material, in particular harmonic steel, having a thickness not higher than 2.5 mm and in particular between 0.1 mm and 2.0 mm, preferably between 0.2 mm and 1.0 mm.

On face 12, the channel 22 has a pair of longitudinal side edges 24 projecting towards each other and locking the foil 23 in the channel 22, and being positioned at a distance from each other (measured perpendicular to the axis A) less than the width of foil 23. The channel 22 and the edges 24 then define fastening members to join the foil 23 to the body 10 of the base element 2.

In embodiments not illustrated, however, the foil 23 is not housed inside the body 10 but it is positioned outside the body 10: the foil 23 is nevertheless positioned along the body 10 parallel to the axis A: the foil 23 and the body 10 are joined by fastening members, for example clips. Thus, again, the base element 2 comprises the body 10 and the foil 23 joined to each other by fastening members.

Preferably, the body 10 has a thickness (measured as a maximum distance between the faces 11, 12) not higher than 20 mm, preferably not higher than 10 mm and in particular between 3 mm and 10 mm; and a height (measured perpendicular to the thickness as a maximum distance between the flanks 13, 14) not higher than 50 mm and in particular between 5 mm and 50 mm.

Due to the material it is made of and its dimensions, the body 10 is foldable by hand around folding axes perpendicular to the axis A and parallel to the faces 11, 12.

The base element 2, as a whole, comprising, in addition to the body 10, the wires 16 and the foil 23 housed in the body 10, is also foldable in the same way, the wires 16 and the foil 23 being also foldable by hand, although made of essentially rigid material, given their dimensions, and in particular given their diameter (cross-section) and thickness.

Support elements 3 are arranged spaced apart from each other along the base element 2 and can be positioned in the desired position when installing lighting system 1.

The support elements 3, suitably positioned along the base element 2, can be used to hold the base element 2 and thus the lighting system 1 as a whole in the desired spatial configuration, i.e., along a predetermined path obtained by folding the base element 2, and to attach the lighting system 1 to a ceiling via fixing members 4, for example, consisting of wires, rods, etc.; additional support elements **3*b* can also be employed to hang the lighting devices 6 from the base element 2**, as further described below.

Figure 3:
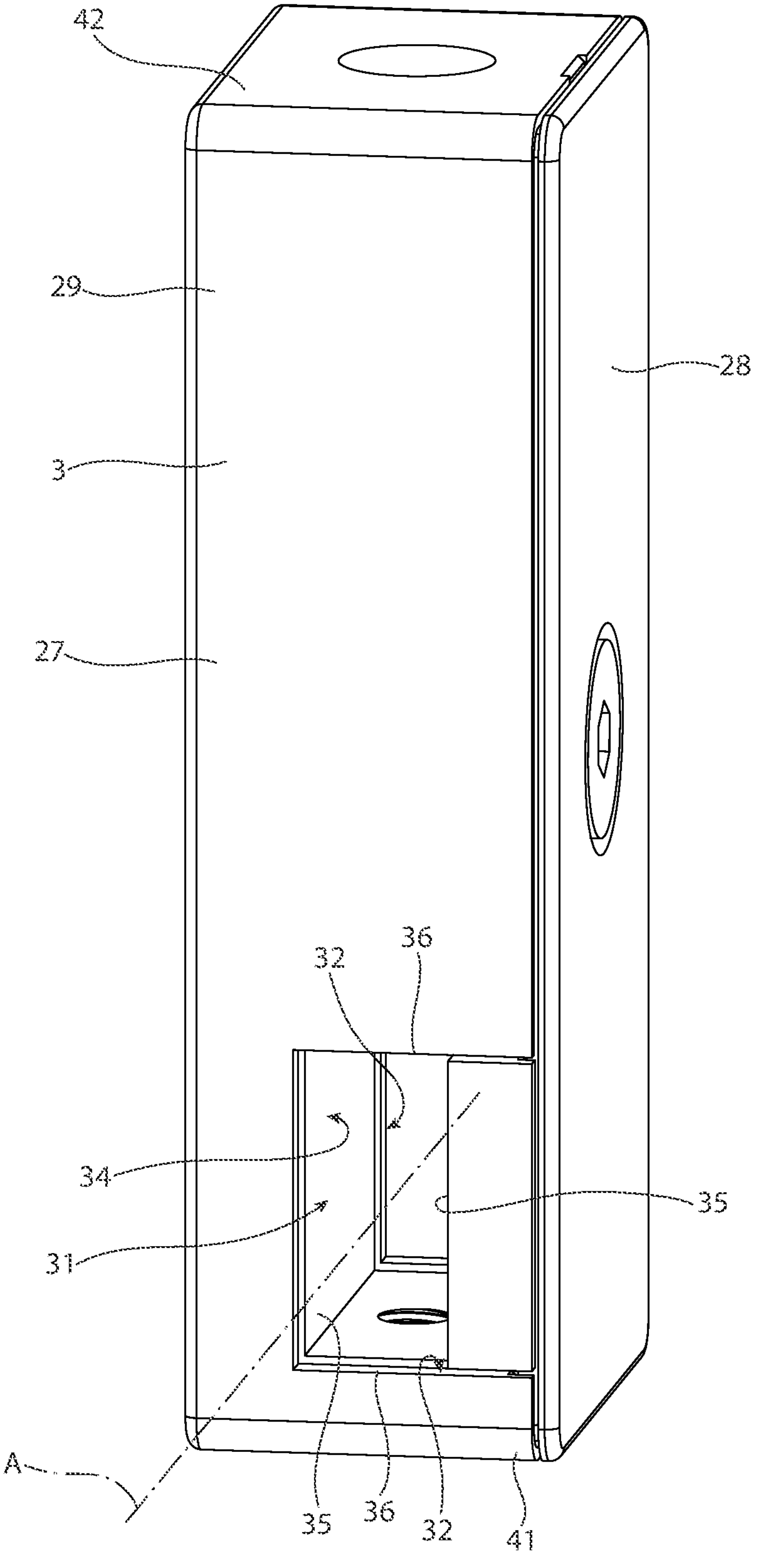
FIG. 3 is a perspective view, in enlarged scale and with parts removed for clarity, of a further detail of the lighting system of FIG. 1.
Figure 4:
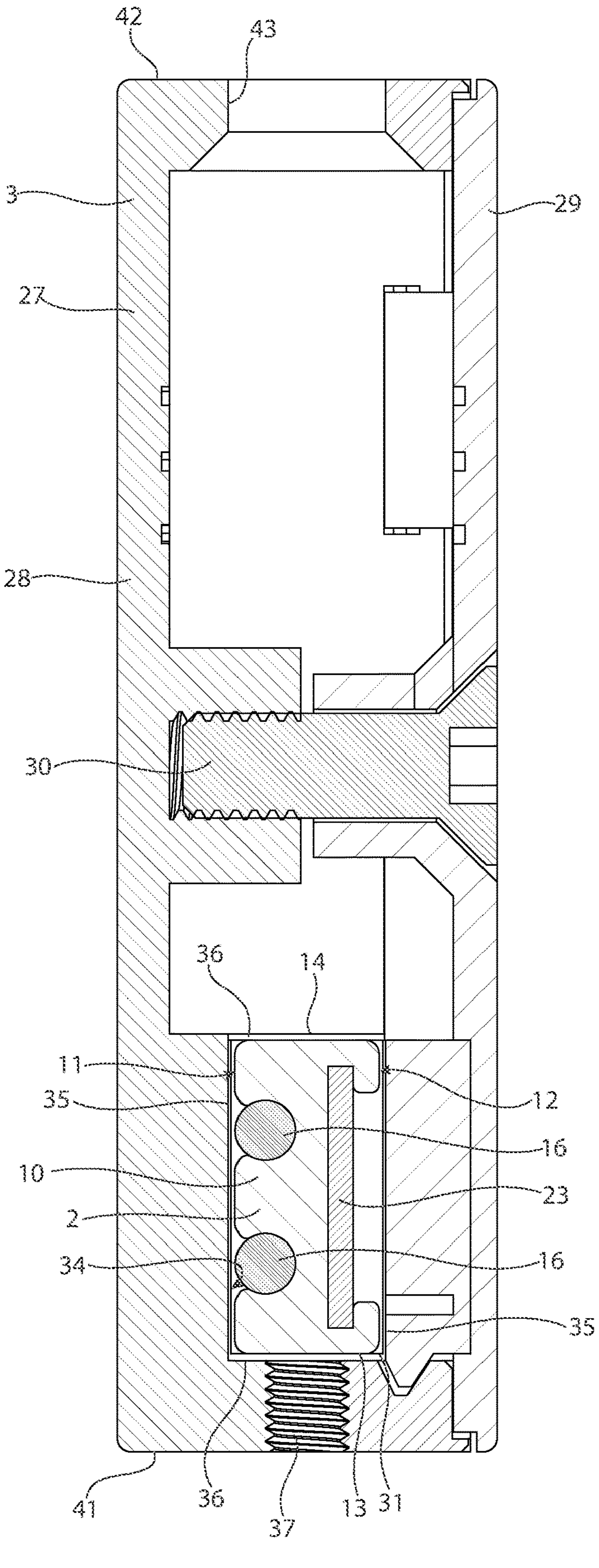
FIG. 4 is a cross-section view of a further detail of the lighting system of FIG. 1.

Also with reference to FIGS. 3 and 4, each support element 3 comprises a shell 27, for example formed by a pair of half-shells 28 joined by a screw 30.

The support element 3 has a seat 31 passing along the axis A, shaped so as to receive the base element 2 passing through the seat 31 and the support element 3; the seat 31 has a pair of openings 32 aligned along the axis A and formed in respective opposite walls of the shell.

The seat 31 is formed through the shell 27 and is delimited by a lateral surface 34 closed in a loop around the axis A. In the illustrated non-limiting example, the seat 31 has a substantially quadrangular, specifically rectangular, cross-section, and has a first pair of lateral walls 35 facing each other and to respective faces 11, 12 of the body 10 of the base element 2, and a second pair of lateral walls 36 perpendicular to the lateral walls 35 and facing each other and to respective flanks 13, 14 of the body 10.

The seat 31 houses the base element 2, which rests with its flank 13 against one of the lateral walls 36 and remains locked between the lateral walls 35, which cooperate in abutment with the faces 11, 12.

To lock the base element 2 in the seat 31 and thus integrally securing the base element 2 to the support element 3, the shell 27 is optionally provided with a locking member 37, for example, a threaded set screw which screws into a corresponding threaded seat formed at a first end 41 of the shell 27.

A second end 42 of the shell 27, opposite the first end 41, is provided with an additional, optionally threaded seat 43, which can be used to receive a fixing member 4, for example, a wire or stem to be attached to the ceiling.

If the support element 3 is employed at a longitudinal end of the base element 2 and thus of the lighting system 1, one of the two openings 32 is used to receive the end of the base element 2, whereas the opposite opening is closed by a cap 44 (FIG. 1).

In addition to the support elements 3 which are employed to shape the base element 2 and hang it from the ceiling (or otherwise from an external surface), the lighting system 1 comprises additional support elements **3*b* to hang the lighting devices 6 from the base element 2. Advantageously, the support elements 3, 3*b* for the two above-mentioned functions have the same structure and comprise the same shell 27; the support elements 3*b* intended to support the lighting devices 6 are used in reverse orientation with respect to the support elements 3, which are intended to hang the lighting system 1**.

The lighting devices 6 supported by the base element 2 can be of various types. In the illustrated example, the lighting devices 6 are in the form of spotlights, but it is understood that the lighting system 1 can include different types of lighting devices 6.

Figure 5:
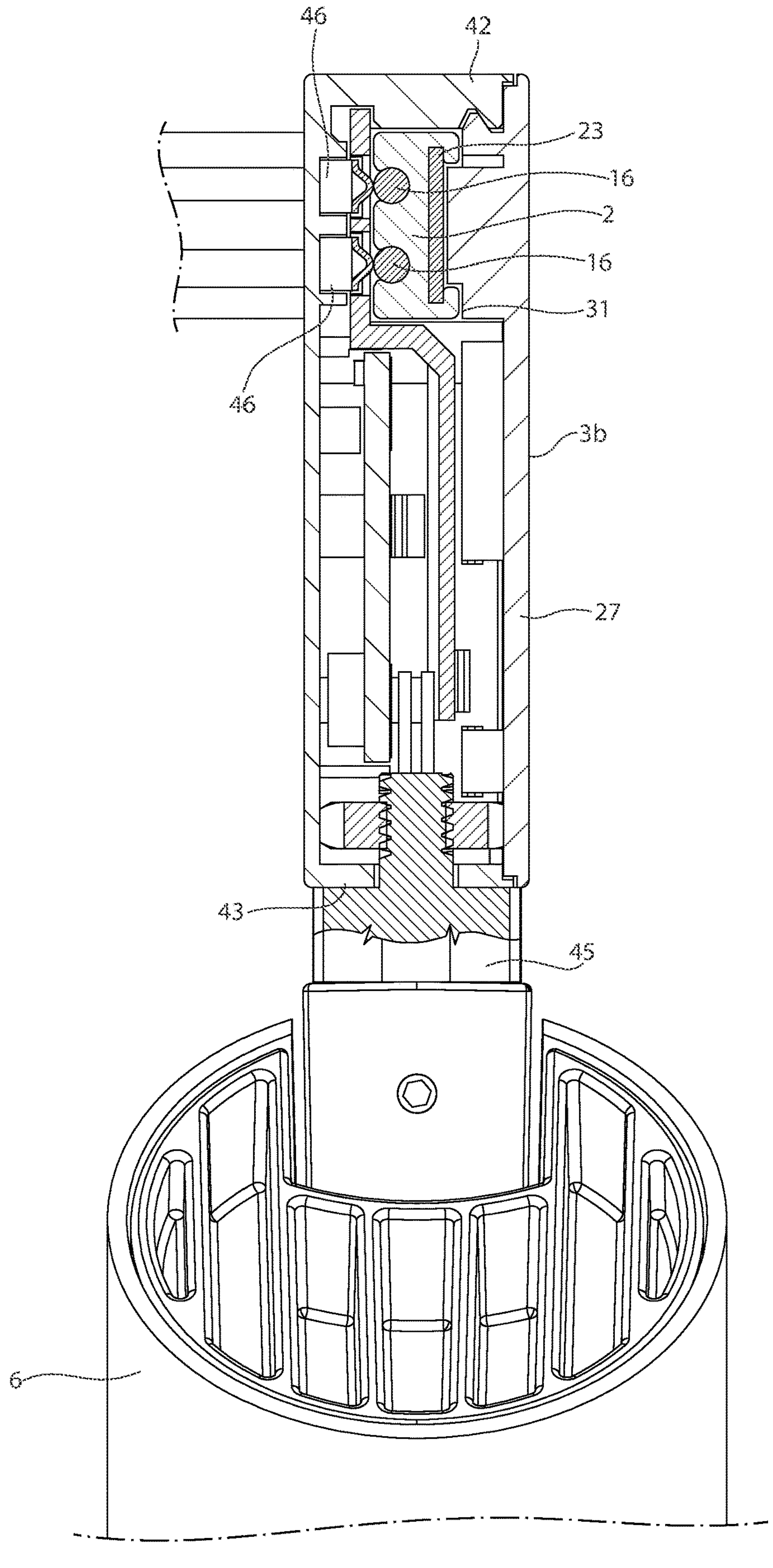
FIG. 5 is a cross-section view of a further detail of the lighting system of FIG. 1.

As shown in FIG. 5, the lighting devices 6 are attached to respective support elements **3*b* via respective attaching portions 45, for example threaded portions, configured to engage the seat 43**.

Again, the base element 2 is inserted so as to pass through the seat 31. In this case, the support element **3*b* is provided with a pair of electrical contacts 46, for example consisting of respective metal clips, positioned one above the other and protruding from one of the lateral walls 35 to contact respective wires 16 of the base element 2 in the seat 31**.

The shell 27 possibly houses electrical and electronic components for supplying and controlling the lighting device 6, which are known and not described nor illustrated for the sake of simplicity.

Additional electrical and electronic components for supplying and controlling the lighting system 1 as a whole can be housed in one of the support elements 3, **3*b*, or in a dedicated control element 47, also positioned along the base element 2 (FIG. 1**).

The lighting system 1 is set up from the base element 2, which can be made in a rectilinear shape and can be wrapped onto itself or otherwise folded for transport.

At the installation site of the lighting system 1, the base element 2 is folded by hand into the desired shape, and the support elements 3 are positioned holding the base element 2 in the desired configuration, and the lighting devices 6 are hung from the base element 2 at the desired positions along the base element 2 via support elements **3*b***.

It is finally understood that modifications and variations can be made to the lighting system described and illustrated herein which do not depart from the scope of the appended claims.

The invention claimed is:

1. A lighting system comprising a band-shaped base element extending along an axis; a plurality of first support elements connected to the base element and provided with fixing members for attaching a surface; and a plurality of lighting devices supported by the base element; characterized in that the base element comprises a band body longitudinally elongated along the axis and made of a flexible polymeric material, the band body having a first face and a second face opposite and parallel to each other and housing at least a pair of conductive metal wires which extend parallel to each other and to the axis along the band body the conductive metal wires being housed in respective longitudinal parallel grooves formed in the first face and extending parallel to the axis, the grooves being open towards the first face so that the conductive metal wires have respective contact portions outside the grooves, and the band body further housing a flat reinforcement foil made of harmonic steel, extending parallel to the axis along the band body and having a thickness between 0.1 mm and 2.0 mm, the flat reinforcement foil being housed in a longitudinal channel extending parallel to the axis and formed in the second face; band body being foldable by hand about folding axes perpendicular to the axis.

2. The lighting system according to claim 1, wherein the band body is made of a polymeric material selected from PVC, PC, PE, mixtures thereof.

3. The lighting system according to claim 1, wherein the band body has a flat cross section between two opposite lateral faces.

4. The lighting system according to claim 3, wherein the band body has a thickness, measured as a maximum distance between said faces, not higher than 20 mm.

5. The lighting system according to claim 1, wherein each wire is secured in the respective groove by a shape coupling.

6. The lighting system according to claim 1, wherein the grooves have a cross section corresponding to the cross section of the wires and have an angular extension greater than 180° so as to secure the respective wires therein.

7. The lighting system according to claim 1, wherein each groove is provided with a front opening formed in the first face of the band body and extending longitudinally along the band body and laterally delimited by respective longitudinal edges which project towards each other and lock the wire in the groove.

8. The lighting system according to claim 1, wherein the wires have a surface cross section not higher than 3.0 $mm^2$.

9. The lighting system according to claim 1, wherein the base element is provided with the flat reinforcement foil extending parallel to the axis along the band body and having a thickness so as to be foldable by hand; and wherein the band body and the foil are joined to each other by fastening members.

10. The lighting system according to claim 9, wherein the foil has a thickness between 0.2 mm and 1.0 mm.

11. The lighting system according to claim 9, wherein the foil is housed in a longitudinal channel formed in a second face of the band body; and wherein the channel has on said second face a pair of longitudinal side edges which project towards each other and lock the foil in the channel.

12. The lighting system according to claim 1, wherein each first support element comprises a shell provided with a seat passing along the axis, shaped so as to receive the base element passing through the seat and the support element; and wherein the seat has a pair of openings aligned along the axis and formed in respective opposite lateral walls of the shell; the seat being formed through the shell and being delimited by a lateral surface closed in a loop around the axis.

13. The lighting system according to claim 12, wherein the shell is provided with a locking member for locking the base element in the seat and thus integrally securing the base element to the support element.

14. The lighting system according to claim 1, wherein the lighting devices are attached to respective second support elements by means of respective attaching portions, configured to engage respective seats in the second support elements.

15. The lighting system according to claim 14, wherein each second support element comprises a shell provided with a seat passing along the axis, shaped so as to receive the base element passing through the seat and the second support element; and wherein the seat has a pair of openings aligned along the axis and formed in respective opposite lateral walls of the shell; each second support element being provided with a pair of electrical contacts, positioned above each other and projecting in the seat to contact respective wires of the base element in the seat.

* * * * *